(12) United States Patent
Pedlow, Jr.

(10) Patent No.: US 7,343,013 B2
(45) Date of Patent: Mar. 11, 2008

(54) COMPOSITE SESSION-BASED ENCRYPTION OF VIDEO ON DEMAND CONTENT

(75) Inventor: Leo M. Pedlow, Jr., Ramona, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 178 days.

(21) Appl. No.: 10/823,431

(22) Filed: Apr. 13, 2004

(65) Prior Publication Data

US 2005/0129233 A1    Jun. 16, 2005

Related U.S. Application Data

(60) Provisional application No. 60/530,071, filed on Dec. 16, 2003.

(51) Int. Cl.
*H04N 7/167* (2006.01)
(52) U.S. Cl. .................................................. 380/239
(58) Field of Classification Search ................ 380/239, 380/200
See application file for complete search history.

(56) References Cited

U.S. PATENT DOCUMENTS

| | | |
|---|---|---|
| 3,852,519 A | 12/1974 | Court |
| 4,381,519 A | 4/1983 | Wilkinson et al. |
| 4,419,693 A | 12/1983 | Wilkinson |
| 4,521,853 A | 6/1985 | Guttag |
| 4,634,808 A | 1/1987 | Moerder |
| 4,700,387 A | 10/1987 | Hirata |
| 4,703,351 A | 10/1987 | Kondo |
| 4,703,352 A | 10/1987 | Kondo |
| 4,710,811 A | 12/1987 | Kondo |
| 4,712,238 A | 12/1987 | Gilhousen et al. |
| 4,722,003 A | 1/1988 | Kondo |
| 4,739,510 A | 4/1988 | Jeffers et al. |
| 4,772,947 A | 9/1988 | Kondo |
| 4,785,361 A | 11/1988 | Brotby |

(Continued)

FOREIGN PATENT DOCUMENTS

EP    0471373    2/1992

(Continued)

OTHER PUBLICATIONS

Liu, et al. Motion Vector Encryption in Multimedia Streaming, 2004, IEEE, pp. 64-71.

(Continued)

*Primary Examiner*—Gilberto Barron, Jr.
*Assistant Examiner*—Farid Homayounmehr
(74) *Attorney, Agent, or Firm*—Miller Patent Services; Jerry A. Miller

(57) ABSTRACT

A Video On Demand (VOD) method consistent with certain embodiments involves processing content by selecting first portions of the content for encryption under a selective encryption system and selecting second portions of the content to remain unencrypted. The first and second portions are stored on the VOD server. If a request is received from the a device having decryption capabilities associated with a first decryption method only the first portions are routed to the encryption device and the second portions are routed around it. This abstract is not to be considered limiting, since other embodiments may deviate from the features described in this abstract.

32 Claims, 3 Drawing Sheets

U.S. PATENT DOCUMENTS

| | | |
|---|---|---|
| 4,788,589 A | 11/1988 | Kondo |
| 4,815,078 A | 3/1989 | Shimura |
| 4,845,560 A | 7/1989 | Kondo et al. |
| 4,887,296 A | 12/1989 | Horne |
| 4,890,161 A | 12/1989 | Kondo |
| 4,914,515 A | 4/1990 | Van Luyt |
| 4,924,310 A | 5/1990 | von Brandt |
| 4,944,006 A | 7/1990 | Citta et al. |
| 4,953,023 A | 8/1990 | Kondo |
| 4,989,245 A | 1/1991 | Bennett |
| 4,995,080 A | 2/1991 | Bestler et al. |
| 5,018,197 A | 5/1991 | Jones et al. |
| 5,023,710 A | 6/1991 | Kondo et al. |
| 5,091,936 A | 2/1992 | Katznelson |
| 5,122,873 A | 6/1992 | Golin |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,151,782 A | 9/1992 | Ferraro |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. |
| 5,258,835 A | 11/1993 | Kato |
| 5,319,707 A | 6/1994 | Wasilewski et al. |
| 5,319,712 A | 6/1994 | Finkelstein et al. |
| 5,325,432 A | 6/1994 | Gardeck et al. |
| 5,327,502 A | 7/1994 | Katata |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,414,852 A | 5/1995 | Kramer et al. |
| 5,416,651 A | 5/1995 | Uetake et al. |
| 5,416,847 A | 5/1995 | Boze |
| 5,420,866 A | 5/1995 | Wasilewski |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,444,782 A | 8/1995 | Adams, Jr. et al. |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,526,427 A | 6/1996 | Thomas et al. |
| 5,528,608 A | 6/1996 | Shimizume |
| 5,535,276 A | 7/1996 | Ganesan |
| 5,539,823 A | 7/1996 | Martin |
| 5,539,828 A | 7/1996 | Davis |
| 5,553,141 A | 9/1996 | Lowry et al. |
| 5,555,305 A | 9/1996 | Robinson et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,598,214 A | 1/1997 | Kondo et al. |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,981 A | 5/1997 | Nerlikar |
| 5,652,795 A | 7/1997 | Eillon et al. |
| 5,663,764 A | 9/1997 | Kondo et al. |
| 5,666,293 A | 9/1997 | Metz et al. |
| 5,696,906 A | 12/1997 | Peters et al. |
| 5,699,429 A | 12/1997 | Tamer et al. |
| 5,703,889 A | 12/1997 | Shimoda et al. |
| 5,717,814 A | 2/1998 | Abecassis |
| 5,726,702 A | 3/1998 | Hamaguchi et al. |
| 5,726,711 A | 3/1998 | Boyce |
| 5,732,346 A | 3/1998 | Lazaridis et al. |
| 5,742,680 A | 4/1998 | Wilson |
| 5,742,681 A | 4/1998 | Giachettie et al. |
| 5,751,280 A | 5/1998 | Abbott et al. |
| 5,751,743 A | 5/1998 | Takizawa |
| 5,751,813 A | 5/1998 | Dorenbos |
| 5,754,650 A | 5/1998 | Katznelson |
| 5,754,658 A | 5/1998 | Aucsmith |
| 5,757,417 A | 5/1998 | Aras et al. |
| 5,757,909 A | 5/1998 | Park |
| 5,768,539 A | 6/1998 | Metz et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasiliewski et al. |
| 5,894,320 A | 4/1999 | Vancelette |
| 5,894,516 A | 4/1999 | Brandenburg |
| 5,915,018 A | 6/1999 | Aucsmith |
| 5,917,830 A | 6/1999 | Chen et al. |
| 5,922,048 A | 7/1999 | Emura |
| 5,923,755 A | 7/1999 | Birch et al. |
| 5,930,361 A | 7/1999 | Hayashi et al. |
| 5,933,500 A | 8/1999 | Blatter et al. |
| 5,940,738 A | 8/1999 | Rao |
| 5,949,877 A | 9/1999 | Traw et al. |
| 5,949,881 A | 9/1999 | Davis |
| 5,963,909 A * | 10/1999 | Warren et al. .................. 705/1 |
| 5,973,679 A | 10/1999 | Abbott et al. |
| 5,973,722 A | 10/1999 | Wakai et al. |
| 5,973,726 A | 10/1999 | Iijima et al. |
| 5,999,622 A | 12/1999 | Yasukawa et al. |
| 5,999,698 A | 12/1999 | Nakai et al. |
| 6,005,561 A | 12/1999 | Hawkins et al. |
| 6,011,849 A | 1/2000 | Orrin |
| 6,012,144 A | 1/2000 | Pickett |
| 6,016,348 A * | 1/2000 | Blatter et al. ............... 380/228 |
| 6,021,199 A * | 2/2000 | Ishibashi ................... 380/217 |
| 6,021,201 A | 2/2000 | Bakhle et al. |
| 6,026,164 A | 2/2000 | Sakamoto et al. |
| 6,028,932 A * | 2/2000 | Park .......................... 380/203 |
| 6,049,613 A | 4/2000 | Jakobsson |
| 6,055,314 A | 4/2000 | Spies et al. |
| 6,055,315 A | 4/2000 | Doyle et al. |
| 6,057,872 A | 5/2000 | Candelore |
| 6,058,186 A | 5/2000 | Enari |
| 6,058,192 A | 5/2000 | Guralnick et al. |
| 6,061,451 A | 5/2000 | Muratani et al. |

| | | | | | | |
|---|---|---|---|---|---|---|
| 6,064,748 | A | 5/2000 | Hogan | 6,543,053 | B1 | 4/2003 | Li et al. |
| 6,065,050 | A | 5/2000 | DeMoney | 6,549,229 | B1 | 4/2003 | Kirby et al. |
| 6,069,647 | A | 5/2000 | Sullivan et al. | 6,550,008 | B1 | 4/2003 | Zhang et al. |
| 6,070,245 | A * | 5/2000 | Murphy et al. ............... 726/3 | 6,557,031 | B1 | 4/2003 | Mimura et al. |
| 6,072,872 | A | 6/2000 | Chang et al. | 6,587,561 | B1 | 7/2003 | Sered et al. |
| 6,072,873 | A | 6/2000 | Bewick | 6,590,979 | B1 | 7/2003 | Ryan |
| 6,073,122 | A | 6/2000 | Wool | 6,640,145 | B2 | 10/2003 | Hoffberg et al. |
| 6,088,450 | A | 7/2000 | Davis et al. | 6,640,305 | B2 | 10/2003 | Kocher et al. |
| 6,105,134 | A | 8/2000 | Pinder et al. | 6,650,754 | B2 | 11/2003 | Akiyama et al. |
| 6,108,422 | A | 8/2000 | Newby et al. | 6,654,389 | B1 | 11/2003 | Brunheroto et al. |
| 6,115,821 | A | 9/2000 | Newby et al. | 6,678,740 | B1 | 1/2004 | Rakib et al. |
| 6,118,873 | A | 9/2000 | Lotspiech et al. | 6,681,326 | B2 | 1/2004 | Son et al. |
| 6,134,237 | A | 10/2000 | Brailean et al. | 6,684,250 | B2 | 1/2004 | Anderson et al. |
| 6,134,551 | A | 10/2000 | Aucsmith | 6,697,489 | B1 | 2/2004 | Candelore |
| 6,138,237 | A | 10/2000 | Ruben et al. | 6,697,944 | B1 | 2/2004 | Jones et al. |
| 6,148,082 | A | 11/2000 | Slattery et al. | 6,707,696 | B1 | 3/2004 | Turner et al. |
| 6,154,206 | A | 11/2000 | Ludtke | 6,714,650 | B1 | 3/2004 | Maillard et al. |
| 6,157,719 | A | 12/2000 | Wasilewski et al. | 6,754,276 | B1 | 6/2004 | Harumoto et al. |
| 6,181,334 | B1 | 1/2001 | Freeman et al. | 6,772,340 | B1 | 8/2004 | Peinado et al. |
| 6,185,369 | B1 | 2/2001 | Ko et al. | 6,788,690 | B2 | 9/2004 | Harri |
| 6,185,546 | B1 | 2/2001 | Davis | 6,788,882 | B1 | 9/2004 | Geer et al. |
| 6,189,096 | B1 | 2/2001 | Haverty | 6,826,185 | B1 | 11/2004 | Montanaro et al. |
| 6,192,131 | B1 | 2/2001 | Geer et al. | 6,883,050 | B1 | 4/2005 | Safadi |
| 6,199,053 | B1 | 3/2001 | Herbert et al. | 6,891,565 | B1 | 5/2005 | Dietrich |
| 6,204,843 | B1 | 3/2001 | Freeman et al. | 6,895,128 | B2 | 5/2005 | Bohnenkamp |
| 6,209,098 | B1 | 3/2001 | Davis | 6,904,520 | B1 | 6/2005 | Rosset et al. |
| 6,215,484 | B1 | 4/2001 | Freeman et al. | 6,917,684 | B1 | 7/2005 | Tatebayashi et al. |
| 6,222,924 | B1 | 4/2001 | Salomaki | 6,938,162 | B1 | 8/2005 | Nagai et al. |
| 6,223,290 | B1 | 4/2001 | Larsen et al. | 6,976,166 | B2 | 12/2005 | Herley et al. |
| 6,226,618 | B1 | 5/2001 | Downs | 7,039,802 | B1 | 5/2006 | Eskicioglu et al. |
| 6,229,895 | B1 | 5/2001 | Son et al. | 7,039,938 | B2 | 5/2006 | Candelore |
| 6,230,194 | B1 | 5/2001 | Frailong et al. | 7,065,213 | B2 | 6/2006 | Pinder |
| 6,230,266 | B1 | 5/2001 | Perlman et al. | 7,096,481 | B1 | 8/2006 | Forecast et al. |
| 6,236,727 | B1 | 5/2001 | Ciacelli et al. | 7,120,250 | B2 | 10/2006 | Candelore |
| 6,240,553 | B1 | 5/2001 | Son et al. | 7,124,303 | B2 | 10/2006 | Candelore |
| 6,246,720 | B1 | 6/2001 | Kutner et al. | 7,127,619 | B2 | 10/2006 | Unger et al. |
| 6,256,747 | B1 | 7/2001 | Inohara et al. | 7,139,398 | B2 | 11/2006 | Candelore et al. |
| 6,263,506 | B1 | 7/2001 | Ezaki et al. | 7,146,007 | B1 | 12/2006 | Maruo et al. |
| 6,266,416 | B1 | 7/2001 | Sigbjornsen et al. | 7,151,831 | B2 | 12/2006 | Candelore et al. |
| 6,266,480 | B1 | 7/2001 | Ezaki et al. | 7,151,833 | B2 | 12/2006 | Candelore et al. |
| 6,272,538 | B1 | 8/2001 | Holden et al. | 7,155,012 | B2 | 12/2006 | Candelore et al. |
| 6,278,783 | B1 | 8/2001 | Kocher et al. | 2001/0030959 | A1 | 10/2001 | Ozawa et al. |
| 6,289,455 | B1 | 9/2001 | Kocher et al. | 2001/0036271 | A1 | 11/2001 | Javed |
| 6,292,568 | B1 | 9/2001 | Akins, III et al. | 2001/0051007 | A1 | 12/2001 | Teshima |
| 6,292,892 | B1 | 9/2001 | Davis | 2002/0003881 | A1 | 1/2002 | Reitmeier et al. |
| 6,307,939 | B1 | 10/2001 | Vigarie | 2002/0021805 | A1 | 2/2002 | Schumann et al. |
| 6,311,012 | B1 | 10/2001 | Cho et al. | 2002/0026587 | A1 | 2/2002 | Talstra et al. |
| 6,324,288 | B1 | 11/2001 | Hoffman | 2002/0046406 | A1 | 4/2002 | Chelehmal et al. |
| 6,351,538 | B1 | 2/2002 | Uz | 2002/0047915 | A1 | 4/2002 | Misu |
| 6,351,813 | B1 | 2/2002 | Mooney et al. | 2002/0059425 | A1 | 5/2002 | Belfiore et al. |
| 6,377,589 | B1 | 4/2002 | Knight et al. | 2002/0066101 | A1 | 5/2002 | Gordon et al. |
| 6,378,130 | B1 | 4/2002 | Adams | 2002/0083317 | A1 | 6/2002 | Ohta et al. |
| 6,389,533 | B1 | 5/2002 | Davis et al. | 2002/0083438 | A1* | 6/2002 | So et al. ................ 725/31 |
| 6,389,537 | B1 | 5/2002 | Davis et al. | 2002/0097322 | A1 | 7/2002 | Monroe et al. |
| 6,415,031 | B1* | 7/2002 | Colligan et al. ............ 380/200 | 2002/0108035 | A1 | 8/2002 | Herley et al. |
| 6,415,101 | B1 | 7/2002 | deCarmo et al. | 2002/0116705 | A1 | 8/2002 | Perlman et al. |
| 6,418,169 | B1 | 7/2002 | Datari | 2002/0126890 | A1 | 9/2002 | Katayama et al. |
| 6,424,717 | B1 | 7/2002 | Pinder et al. | 2002/0129243 | A1 | 9/2002 | Nanjundiah |
| 6,430,361 | B2 | 8/2002 | Lee | 2002/0144260 | A1 | 10/2002 | Devara |
| 6,445,738 | B1 | 9/2002 | Zdepski et al. | 2002/0150239 | A1 | 10/2002 | Carny et al. |
| 6,449,718 | B1 | 9/2002 | Rucklidge et al. | 2002/0157115 | A1 | 10/2002 | Lu |
| 6,452,923 | B1 | 9/2002 | Gerszberg et al. | 2002/0164022 | A1 | 11/2002 | Strasser et al. |
| 6,453,115 | B1 | 9/2002 | Boyle | 2002/0170053 | A1 | 11/2002 | Peterka et al. |
| 6,456,985 | B1 | 9/2002 | Ohtsuka | 2002/0184506 | A1 | 12/2002 | Perlman |
| 6,459,427 | B1 | 10/2002 | Mao et al. | 2002/0194613 | A1 | 12/2002 | Unger |
| 6,463,152 | B1 | 10/2002 | Takahashi | 2002/0196939 | A1 | 12/2002 | Unger et al. |
| 6,466,671 | B1 | 10/2002 | Maillard et al. | 2003/0002854 | A1 | 1/2003 | Belknap et al. |
| 6,505,032 | B1 | 1/2003 | McCorkle et al. | 2003/0009669 | A1 | 1/2003 | White et al. |
| 6,505,299 | B1 | 1/2003 | Zeng et al. | 2003/0012286 | A1 | 1/2003 | Ishtiaq et al. |
| 6,510,554 | B1 | 1/2003 | Gorden et al. | 2003/0021412 | A1 | 1/2003 | Candelore et al. |
| 6,519,693 | B1 | 2/2003 | Debey | 2003/0026423 | A1 | 2/2003 | Unger et al. |
| 6,526,144 | B2 | 2/2003 | Markandey et al. | 2003/0026523 | A1 | 2/2003 | Unger et al. |
| 6,529,526 | B1 | 3/2003 | Schneidewend | 2003/0028879 | A1 | 2/2003 | Gordon et al. |

| | | |
|---|---|---|
| 2003/0035482 A1 | 2/2003 | Klompenhouwer et al. |
| 2003/0035540 A1 | 2/2003 | Freeman et al. |
| 2003/0035543 A1 | 2/2003 | Gillon |
| 2003/0046686 A1 | 3/2003 | Candelore et al. |
| 2003/0046687 A1 | 3/2003 | Hodges et al. |
| 2003/0059047 A1 | 3/2003 | Iwamura |
| 2003/0063615 A1 | 4/2003 | Luoma et al. |
| 2003/0072555 A1 | 4/2003 | Yap et al. |
| 2003/0077071 A1 | 4/2003 | Lin et al. |
| 2003/0081630 A1 | 5/2003 | Mowery et al. |
| 2003/0081776 A1 | 5/2003 | Candelore |
| 2003/0084284 A1 | 5/2003 | Ando et al. |
| 2003/0097662 A1 | 5/2003 | Russ et al. |
| 2003/0112333 A1 | 6/2003 | Chen et al. |
| 2003/0118243 A1 | 6/2003 | Sezer et al. |
| 2003/0123664 A1 | 7/2003 | Pedlow et al. |
| 2003/0123849 A1 | 7/2003 | Nallur et al. |
| 2003/0126086 A1 | 7/2003 | Safadi |
| 2003/0133570 A1 | 7/2003 | Candelore et al. |
| 2003/0140257 A1 | 7/2003 | Peterka et al. |
| 2003/0145329 A1 | 7/2003 | Candelore |
| 2003/0152224 A1 | 8/2003 | Candelore et al. |
| 2003/0152226 A1 | 8/2003 | Candelore et al. |
| 2003/0156718 A1 | 8/2003 | Candelore et al. |
| 2003/0159139 A1 | 8/2003 | Candelore et al. |
| 2003/0159140 A1 | 8/2003 | Candelore |
| 2003/0159152 A1 | 8/2003 | Lin et al. |
| 2003/0174837 A1 | 9/2003 | Candelore et al. |
| 2003/0174844 A1 | 9/2003 | Candelore |
| 2003/0188154 A1 | 10/2003 | Dallard |
| 2003/0188164 A1 | 10/2003 | Okimoto et al. |
| 2003/0190054 A1 | 10/2003 | Troyansky et al. |
| 2003/0193973 A1 | 10/2003 | Takashimizu et al. |
| 2003/0198223 A1 | 10/2003 | Mack et al. |
| 2003/0204717 A1 | 10/2003 | Kuehnel |
| 2003/0222994 A1 | 12/2003 | Dawson |
| 2003/0226149 A1 | 12/2003 | Chun et al. |
| 2003/0228018 A1 | 12/2003 | Vince |
| 2004/0003008 A1 | 1/2004 | Wasilewski et al. |
| 2004/0010717 A1 | 1/2004 | Simec et al. |
| 2004/0021764 A1 | 2/2004 | Driscoll, Jr. et al. |
| 2004/0028227 A1 | 2/2004 | Yu |
| 2004/0047470 A1 | 3/2004 | Candelore |
| 2004/0049688 A1 | 3/2004 | Candelore et al. |
| 2004/0049690 A1 | 3/2004 | Candelore et al. |
| 2004/0049691 A1 | 3/2004 | Candelore et al. |
| 2004/0049694 A1 | 3/2004 | Candelore |
| 2004/0064688 A1 | 4/2004 | Jacobs |
| 2004/0068659 A1 | 4/2004 | Diehl |
| 2004/0073917 A1 | 4/2004 | Pedlow, Jr. et al. |
| 2004/0078575 A1 | 4/2004 | Morten et al. |
| 2004/0081333 A1 | 4/2004 | Grab et al. |
| 2004/0086127 A1 | 5/2004 | Candelore |
| 2004/0088552 A1 | 5/2004 | Candelore |
| 2004/0088558 A1 | 5/2004 | Candelore |
| 2004/0091109 A1 | 5/2004 | Son et al. |
| 2004/0100510 A1 | 5/2004 | Milic-Frayling et al. |
| 2004/0123094 A1 | 6/2004 | Sprunk |
| 2004/0136532 A1 | 7/2004 | Pinder et al. |
| 2004/0139337 A1 | 7/2004 | Pinder et al. |
| 2004/0151314 A1 | 8/2004 | Candelore |
| 2004/0158721 A1 | 8/2004 | Candelore |
| 2004/0165586 A1 | 8/2004 | Read et al. |
| 2004/0172650 A1 | 9/2004 | Hawkins et al. |
| 2004/0181666 A1 | 9/2004 | Candelore |
| 2004/0187161 A1 | 9/2004 | Cao |
| 2004/0193550 A1 | 9/2004 | Siegal |
| 2004/0240668 A1 | 12/2004 | Bonan et al. |
| 2004/0247122 A1 | 12/2004 | Hobrock et al. |
| 2004/0261099 A1 | 12/2004 | Durden et al. |
| 2004/0267602 A1 | 12/2004 | Gaydos et al. |
| 2005/0004875 A1 | 1/2005 | Kontio et al. |
| 2005/0028193 A1 | 2/2005 | Candelora et al. |
| 2005/0036067 A1 | 2/2005 | Ryal et al. |
| 2005/0063541 A1 | 3/2005 | Candelore |
| 2005/0066357 A1 | 3/2005 | Ryal |
| 2005/0071669 A1 | 3/2005 | Medvinsky et al. |
| 2005/0094808 A1 | 5/2005 | Pedlow, Jr. et al. |
| 2005/0094809 A1 | 5/2005 | Pedlow, Jr. et al. |
| 2005/0097596 A1 | 5/2005 | Pedlow, Jr. |
| 2005/0097597 A1 | 5/2005 | Pedlow, Jr. et al. |
| 2005/0097598 A1 | 5/2005 | Pedlow, Jr. et al. |
| 2005/0097614 A1 | 5/2005 | Pedlow, Jr. et al. |
| 2005/0102702 A1 | 5/2005 | Candelore et al. |
| 2005/0129233 A1 | 6/2005 | Pedlow, Jr. |
| 2005/0141713 A1 | 6/2005 | Genevols |
| 2005/0169473 A1 | 8/2005 | Candelore |
| 2005/0192904 A1 | 9/2005 | Candelore |
| 2005/0198586 A1 | 9/2005 | Sekiguchi et al. |
| 2005/0259813 A1 | 11/2005 | Wasilewski et al. |
| 2005/0265547 A1 | 12/2005 | Strasser et al. |
| 2006/0115083 A1 | 6/2006 | Candelore et al. |
| 2006/0130119 A1 | 6/2006 | Candelore et al. |
| 2006/0130121 A1 | 6/2006 | Candelore et al. |
| 2006/0136976 A1 | 6/2006 | Coupe et al. |
| 2006/0153379 A1 | 7/2006 | Candelore et al. |
| 2006/0168616 A1 | 7/2006 | Candelore |
| 2006/0174264 A1 | 8/2006 | Candelore |
| 2006/0262926 A1 | 11/2006 | Candelore et al. |
| 2006/0269060 A1 | 11/2006 | Candelore et al. |

FOREIGN PATENT DOCUMENTS

| | | |
|---|---|---|
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0674440 | 9/1995 |
| EP | 0674441 | 9/1995 |
| EP | 0833517 | 4/1998 |
| EP | 0866615 | 9/1998 |
| EP | 1187483 | 3/2002 |
| JP | 7067028 | 3/1995 |
| JP | 11243534 | 10/2002 |
| WO | WO 86/07224 | 12/1986 |
| WO | WO 94/10775 | 5/1994 |
| WO | WO 97/38530 | 10/1997 |
| WO | WO 00/31964 | 6/2000 |
| WO | WO 01/65762 | 9/2001 |
| WO | WO 01/78386 | 10/2001 |

OTHER PUBLICATIONS

Alattar, A.M. et al., Improved selective encryption techniques for secure transmission of MPEG video bitstreams, Oct. 24, 1999, Digimarc Corp., Lake Oswego, OR, USA, IEEE, pp. 256-260.

Kunkelmann T. et al., A scalable security architecture for multimedia communication standards, Darmstard Univ. of Technology, ITO, Germany, 1997, pp. 660-661.

Yip, Kun-Wah, Partial-encryption technique for intellectual property protection of FPGA-Based products, Dec. 15, 1999, IEEE, pp. 183-190.

International Search Report for application No. PCT/US2004/032228.

"A Report on Security Issues in Multimedia" by Gulwani, pp. 10-14, Apr. 30, 2000, Course Notes, Department of Computer Science and Engineering, Indian Institute of Technology Kanpur.

"Ad Agencies and Advertisers To Be Empowered with Targeted Ads Delivered by Television's Prevailing Video Servers" Article Business Section of The New York Times, Updated Thursday, Dec. 20, 2001.

"An Efficient MPEG Video Encryption Algorithm" by Shi and Bhargava, pp. 381-386, 1998 IEEE.

"An Empirical Study of Secure MPEG Video Transmissions" by Agi and Gong, pp. 137-144, 1996, IEEE, Proceedings of SNDSS '96.

"Applying Encryption to Video Communication" by Kunkelmann, pp. 41-47, Sep. 1998, Multimedia and Security Workshop at ACM Multimedia '98. Bristol, U.K.

"Comparison of MPEG Encryption Algorithms" by Qiao and Nahrstedt, Jan. 17, 1998, Preprint submitted to Elsevier Science.

"Coral Consortium Aims to Make DRM Interoperable", by Bill Rosenblatt, Oct. 7, 2004, online at http://www.drmwatch.com/standards/article.php/3418741.

"DVD Demystified—The Guidebook for DVD-Video and DVD-ROM" by Jim Taylor, Pub. McGraw-Hill, 1998, ISBN: 0-07-064841-7, pp. 134-147.

"Dynamic-Customized TV Advertising Creation and Production Tools" by SeaChange International, Web Site Literature.

"Efficient Frequency Domain Video Scrambling for Content Access Control" by Zeng and Lei, Nov. 1999, In Proc. ACM Multimedia.

"Evaluation of Selective Encryption Techniques for Secure Transmission of MPEG-Compressed Bit-Streams" by Alattar and Al-Regib, pp. IV-340 to IV-343, 1999, IEEE.

"Fast Encryption Methods for Audiovisual Data Confidentiality" by Wu and Kuo, Nov. 2000, SPIE International Symposia on Information Technologies 2000, (Boston, Ma., USA).

"Improved Selective Encryption Techniques for Secure Transmission of MPEG Video Bit-Streams" by Alattar, Al-Regib and Al-Semari, pp. 256-260, 1999, IEEE.

Metro Media™ PVR-DVD-MP3-Web—Internet publication from www.metrolink.com, undated.

"Multimedia and Security Workshop at ACM Multimedia" '98. Bristol, U.K., Sep. 1998.

"Passage™, Freedom to Choose", 2003, Sony Electronics Inc.

"Performance Study of a Selective Encryption Scheme for the Security of Networked, Real-Time Video" by Spanos and Maples, pp. 2-10, 1995, IEEE.

"Pre-Encryption Profiles—Concept Overview and Proposal", Rev. 1.2 as submitted to the Open CAS consortium on Dec. 28, 2000.

"Run-Time Performance Evaluation for a Secure MPEG System Supporting Both Selective Watermarking and Encryption" by Wu and Wu, Mar. 1, 1997, submitted to JSAC special issue on Copyright and Privacy Protection.

"Selective Encryption and Watermarking of MPEG Video (Extended Abstract)" by Wu and Wu, Feb. 17, 1997, submitted to Internatioanal Conference on Image Science, Systems, and Technology, CISST'97.

"The Long March to Interoperable Digital Rights Management" by Koenen et al., pp. 1-17, 2004, IEEE.

"Transport Streams Insertion of Video in the Compressed Digital Domain" by SeaChange International, Web Site Literature, 2000.

"Visible World—A High Impact Approach to Customized Television Advertising" by Haberman, Dec. 2001.

Anonymous, Message Authentication with Partial Encryption, Research discosure RD 296086, Dec. 10, 1998.

Anonymous, New Digital Copy Protection Proposal Would Secure Authorized Copies, PR Newswire, Nov. 1998, pp. 1-3.

Aravind, H. , et al., "Image and Video Coding Standards", AT&T Technical Journal, (Jan./Feb. 1993),67-68.

Gonzalez, R. C., et al., "Digital Image Processing", Addison Wesley Publishing Company, Inc., (1992),346-348.

Kim, et al., "Bit Rate Reduction Algorithm for a Digital VCR", IEEE Transactions on Consumer Electronics, vol. 37, No. 3, (Aug. 1, 1992),267-274.

Kondo, et al., "A New Concealment Method for Digital VCRs", IEEE Visual Signal Processing and Communication, Melbourne, Australia,(Sep. 1993),20-22.

Kondo, et al., "Adaptive Dynamic Range Coding Scheme for Future Consumer Digital VTR", 219-226.

Kondo, et al., "Adaptive Dynamic Range Coding Scheme for Future HDTV Digital VTR", Sony Corporation, (1991).

Lakshiminath, et al., "A Dual Protocol for Scalable Secure Multicasting", 1999 International Symposium on Computers and Communication, Jul. 6-8, 1999.

Lookabaugh et al., "Selective Encryption and MPEG-2", ACM Multimedia '03, Nov. 2003.

Menezes, Alfred J., et al., "Handbook of Applied Cryptography", CRC Press, 551-553.

NHK Laboratories Note, "Error Correction, Concealment and Shuffling", No. 424, (Mar. 1994),29-44.

Park, et al., "A Simple Concealment for ATM Bursty Cell Loss", IEEE Transactions on Consumer Electronics, No. 3, (Aug. 1993),704-709.

Robert et al., "Digital Cable: The Key to Your Content", Access Intelligence's Cable Group, Feb. 2002, online at http:www.cableworld.com/ct/archives/0202/0202digitalrights.html.

Tom, et al., "Packet Video for Cell Loss Protection Using Deinterleaving and Scrambling", ICASSP 91: 1991 International Conference on Acoustics, Speech and Signal Processing, vol. 4, (Apr. 1991),2857-2860.

Zhu, et al., "Coding and Cell-Loss Recovery in DCT-Based Packeet Video", IEEE Transactions on Circuits and Systems for Video Technology, No. 3, NY,(Jun. 3, 1993).

"ClearPlay: The Technology of Choice", from web site, ClearPlay 2001-2003.

International Search Report and Written Opinion of the International Searching Authority, PCT/US04/34091 (filed Oct. 18, 2004), May 16, 2006.

Microsoft Windows XP, Oct. 2001, Microsoft, Screen Shots and Help Files.

MPEG-2 Digital Broadcast Pocket Guide vol. 6, Copyright 201 Acterna, LLC.

* cited by examiner

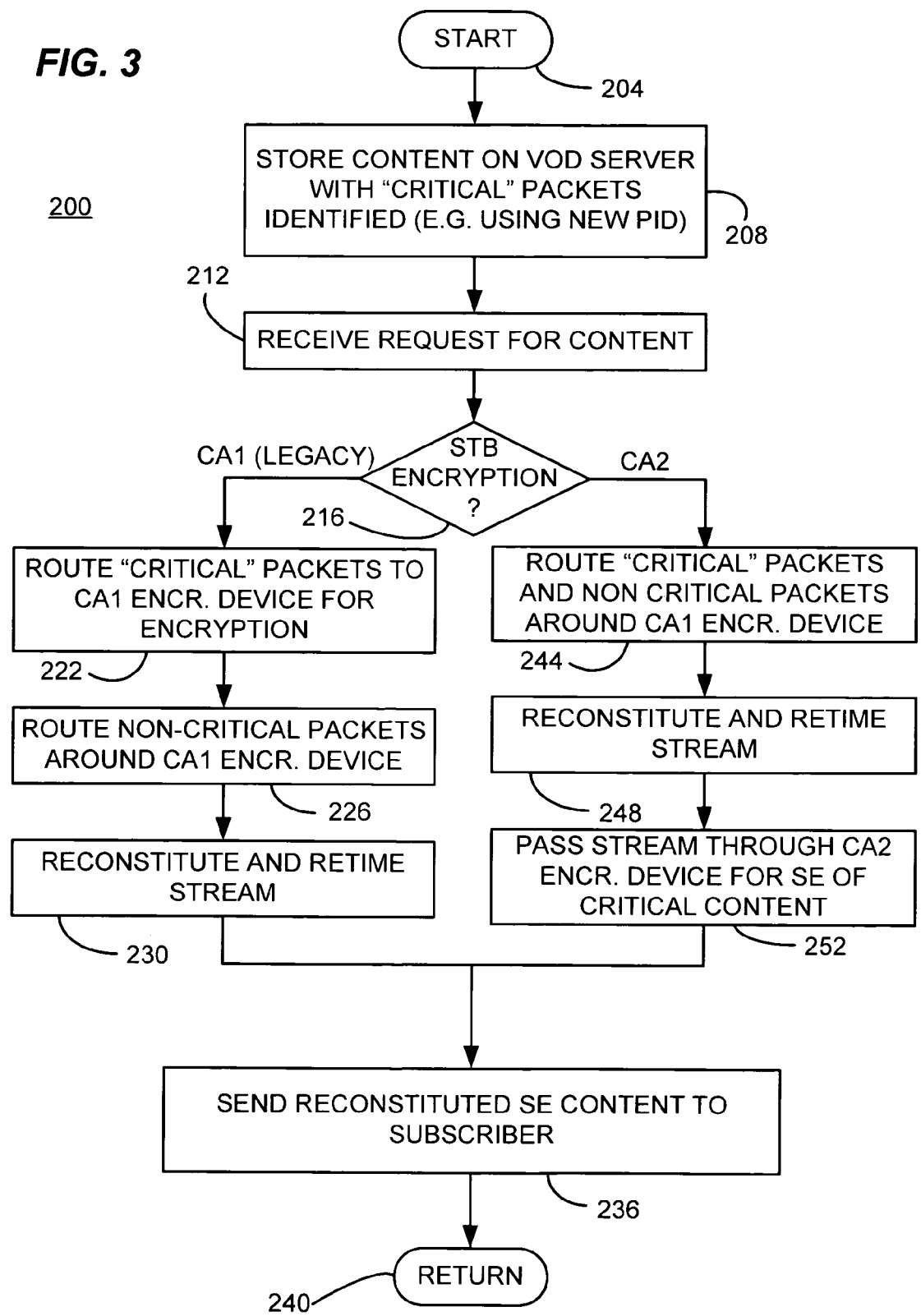

COMPOSITE SESSION-BASED ENCRYPTION OF VIDEO ON DEMAND CONTENT

CROSS REFERENCE TO RELATED DOCUMENTS

This application is related to and claims priority benefit of U.S. Provisional Patent Application Ser. No. 60/530,071 filed Dec. 16, 2003 to Pedlow for "Composite Session Based Encryption of Video On Demand Content" which is hereby incorporated by reference. This application is also related to U.S. Patent Applications entitled "Critical Packet Partial Encryption" to Unger et al., Ser. No. 10/038,217; patent applications entitled "Time Division Partial Encryption" to Candelore et al., Ser. No. 10/038,032; "Elementary Stream Partial Encryption" to Candelore, Ser. No. 10/037,914; "Partial Encryption and PID Mapping" to Unger et al., Ser. No. 10/037,499; and "Decoding and Decrypting of Partially Encrypted Information" to Unger et al., Ser. No. 10/037,498 all of which were filed on Jan. 2, 2002 and are hereby incorporated by reference herein.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

The Passage™ initiative (Passage is a trademark of Sony Electronics Inc.), promoted by Sony, provides a mechanism for MSOs (Multiple Service Operators) to deploy non-legacy headend equipment, subscriber devices and services on their existing legacy networks. In the USA, these networks are most commonly supplied by either Motorola (former General Instrument) or Scientific Atlanta. These two companies at present constitute better than a 99% share of the US cable system market as turnkey system providers. The systems, by design, employ proprietary technology and interfaces precluding the introduction of non-incumbent equipment into the network. An MSO, once choosing one of these suppliers during conversion from an analog cable system to a digital cable system, faces a virtual monopoly when seeking suppliers for additional equipment as their subscriber base or service offering grows.

Before the Passage™ initiative, the only exit from this situation was to forfeit the considerable capital investment already made with the incumbent provider, due to the intentional incompatibility of equipment between the incumbent and other sources. One primary barrier to interoperability is in the area of conditional access systems, the heart of addressable subscriber management and revenue collection resources in a modern digital cable network.

The Passage™ technologies were developed to allow the independent coexistence of two or more conditional access systems on a single, common plant. Unlike other attempts to address the issue, the two systems operate with a common transport stream without any direct or indirect interaction between the conditional access systems. The basic processes used in these technologies are discussed in detail in the above-referenced pending patent applications.

The above-referenced commonly owned patent applications, and others, describe inventions relating to various aspects of methods generally referred to herein as partial encryption or selective encryption, consistent with certain aspects of Passage™. More particularly, systems are described therein wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent of data overhead is consumed to effectively encrypt the content using multiple encryption systems. This results in a cable or satellite system being able to utilize Set-top boxes (STB) or other implementations of conditional access (CA) receivers from multiple manufacturers in a single system—thus freeing the cable or satellite company to competitively shop for providers of Set-top boxes.

In each of these disclosures, the clear content is identified using a primary Packet Identifier (PID). A secondary PID (or shadow PID) is also assigned to the program content. Selected portions of the content are encrypted under two (or more) encryption systems and the encrypted content transmitted using both the primary and secondary PIDs (one PID or set of PIDs for each encryption system). The so-called legacy STBs operate in a normal manner decrypting encrypted packets arriving under the primary PID and ignoring secondary PIDs. The newer (non-legacy) STBs operate by associating both the primary and secondary PIDs with a single program. Packets with a primary PID are decoded normally and packets with a secondary PID are first decrypted then decoded. The packets associated with both PIDs are then assembled together to make up a single program stream. The PID values associated with the packets are generally remapped to a single PID value for decoding (shadow PIDs remapped to the primary PID value or vice versa.)

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 3 is a flow chart depicting operation of a composite session based encrypted VOD embodiment consistent with certain embodiments of the present invention.

ACRONYMS, ABBREVIATIONS AND DEFINITIONS

Figure 1:
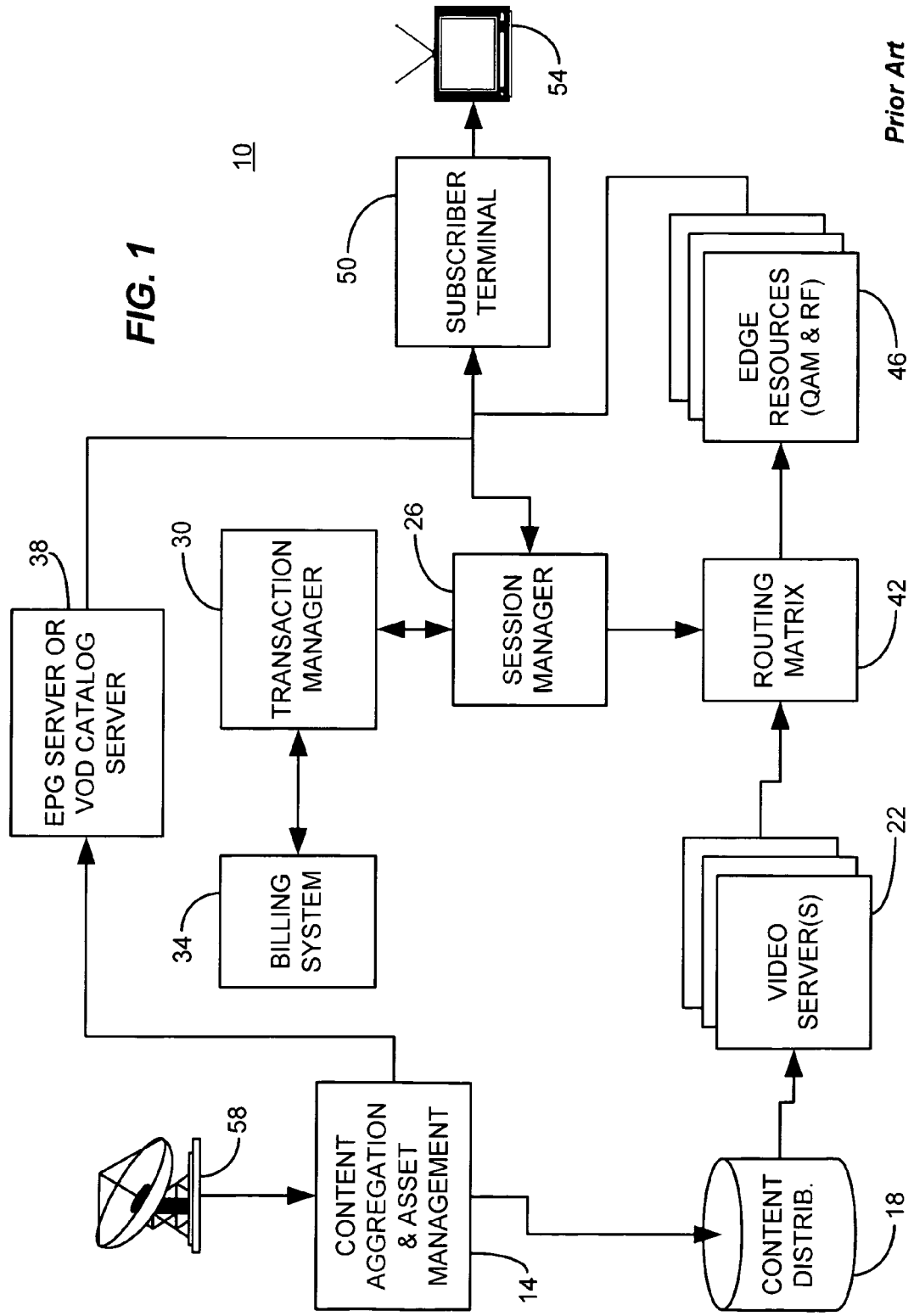
FIG. 1 is a block diagram of a clear video VOD system.

ASI—Asynchronous Serial Interface
CA—Conditional Access
CASID—Conditional Access System Identifier
CPE—Customer Premises Equipment
DHEI—Digital Headend Extended Interface
ECM—Entitlement Control Message
EPG—Electronic Program Guide
GOP—Group of Pictures (MPEG)
MPEG—Moving Pictures Experts Group MSO—Multiple System Operator
OLES—Off Line Encryption System
PAT—Program Allocation Table
PID—Packet Identifier
PMT—Program Map Table
PSI—Program Specific Information
QAM—Quadrature Amplitude Modulation
RAM—Random Access Memory
RAID—Redundant Array of Independent Disks
SAN—Storage Area Network
VOD—Video on Demand
Critical Packet—A packet or group of packets that, when encrypted, renders a portion of a video image difficult or impossible to view if not properly decrypted, or which renders a portion of audio difficult or impossible to hear if not properly decrypted. The term "critical" should not be interpreted as an absolute term, in that it may be possible to hack an elementary stream to overcome encryption of a "critical packet", but when subjected to normal decoding, the inability to fully or properly decode such a "critical packet" would inhibit normal viewing or listening of the program content.
Selective Encryption (or Partial Encryption)—encryption of only a portion of an elementary stream in order to render the stream difficult or impossible to use (i.e., view or hear).
Dual Selective Encryption—encryption of portions of a single selection of content under two separate encryption systems.
Passage™—Trademark of Sony Electronics Inc. for various single and multiple selective encryption systems, devices and processes.
Trick mode—an operational mode of playback of digital content to simulate fast forward, rewind, pause, suspend (stop), slow motion, etc. operations as in a video tape system.

The terms "a" or "an", as used herein, are defined as one, or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/ dynamic load library and/or other sequence of instructions designed for execution on a computer system.

The terms "scramble" and "encrypt" and variations thereof may be used synonymously herein. Also, the term "television program" and similar terms can be interpreted in the normal conversational sense, as well as a meaning wherein the term means any segment of A/V content that can be displayed on a television set or similar monitor device. The term "video" is often used herein to embrace not only true visual information, but also in the conversational sense (e.g., "video tape recorder") to embrace not only video signals but associated audio and data. The term "legacy" as used herein refers to existing technology used for existing cable and satellite systems. The exemplary embodiments of VOD disclosed herein can be decoded by a television Set-Top Box (STB), but it is contemplated that such technology will soon be incorporated within television receivers of all types whether housed in a separate enclosure alone or in conjunction with recording and/or playback equipment or Conditional Access (CA) decryption module or within a television set itself.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

Clear VOD Architectures

The decision on a particular VOD architecture is the result of the interaction between a complex set of both independent and dependent variables, providing a solution to an equation of state. Some of the variables are fixed directly as a result of choices by the MSO. Others are constrained by factors such as the existing incumbent system, location, size, available capital and return on investment requirements.

A generalized VOD system 10, as shown in FIG. 1, contains some or all of the following elements/resources: Content Aggregation and Asset management 14, Content distribution (SAN) 18, Video server module(s) 22, Session Management 26, Transaction management 30, Billing system 34, EPG server or VOD catalog server 38, Transport router/switch fabric (routing matrix) 42, Stream encryption device(s) (not shown in this Figure), and QAM modulators/ upconverters and other edge resources 46. This VOD system 10 provides programming to the subscriber terminals such as 50 for ultimate viewing and listening on a TV set or other monitor device 54.

In operation, content is received from various sources including, but not limited to, satellite broadcasts received via one or more satellite dishes 58. Content is aggregated at 14 and cataloged at EPG server or VOD catalog server 38. Content is then distributed at 18 to one or more video servers 22. When a subscriber orders a VOD selection, a message is sent from the subscriber terminal (e.g., STB) 50 to the session manager 26. The session manager 26 notifies the transaction manager 30 to assure that the billing system 34 is properly brought into play. The session manager 26 selects a VOD server from a cluster of VOD servers having the requested content on it and having a signal path that reaches the node serving the subscriber. The session manager also enables the routing matrix 42 to properly route the selected video content through the correct edge resources 46 for delivery to the subscriber terminal 50.

VOD Program Specific Information

A function of the VOD video server(s) 22, in addition to origination of session A/V content, is the creation of the associated, session specific PSI (program specific information). This information is a departure from the broadcast model in that the PSI is extremely dynamic. The content of the PAT and subordinate PMTs change whenever a new session is started or ended. In the broadcast world, the PSI changes very seldom because the PSI tables reflect only the structure of the transport multiplex, not the actual A/V content carried within.

The VOD video server 22 or associated headend hardware or software dynamically assigns a new session to an existing, available "slot" in an outgoing transport multiplexed stream. The slot is denoted by the MPEG program number and in many cases, the combination of which transport stream (TSID) and program number determine at the service level a unique session and the routing that occurs as a result. Edge resources 46 generally are not configured dynamically. The routing of content appearing on a particular input port to a specific QAM carrier at the output is determined through a preconfigured, static assignment of TSID/input port and program number mapping to specific QAM resources in the device. This same mapping information is also loaded in the VOD system so that once a session is requested by and authorized for a specific subscriber terminal 50, a solution to a routing matrix 42 can be determined to find the appropriate VOD server 22 and QAM transport 46 serving the requestor. This solution also considers dynamic issues such as which servers 22 the requested asset is loaded upon, and server loading/available slots in addition to the simpler, static solution to finding the first possible path to the requesting subscriber terminal 50.

In addition to solving the routing matrix 42 and provisioning the session with PIDs and PSI appropriate to follow the intended route, elements of the same information (program ID and QAM frequency) are also communicated to the session client at subscriber terminal 50 at the subscriber's premises so that the requested stream can be properly received and presented to the subscriber.

Clear VOD Distribution

Perhaps the simplest VOD implementation is a clear VOD distribution system, i.e. one that contains no encryption as depicted in FIG. 1. While not providing any safekeeping of what might be considered the entertainment medium's most valuable properties, namely current feature films, etc., clear VOD avoids many of the issues that the incumbent cable system providers to date have not adequately addressed and that introduction of a second, alternative CA system complicates even further still. Various arrangements for providing selective or full encryption in a VOD environment are discussed below. Throughout this discussion, it is instructive to carry an example VOD movie through the various embodiments to illustrate the relative storage efficiencies obtained with the various systems disclosed. A real world example of a VOD movie which will be used throughout this document has the following attributes:

Compressed video data rate: 3 Mbit/S
Movie length: 120 minutes (2 Hrs)
I-frame overhead: 17%
Total storage used for the video portion of a single, clear (unencrypted) copy of a film: 3.618 GBytes.

Session-Based Encryption VOD Distribution

In session based encryption, a basic premise is that a classic (clear) VOD server 22 such as shown in FIG. 1, is modified to add an encryption device in series with the transport stream between the video server 22 and the QAM modulator of 46. In certain embodiments, the encryption device may be integrated with the QAM modulator 46 and/or other components. The commercially available Scientific-Atlanta MQAM and Harmonic NSG products are commercial examples of such devices.

The outgoing transport stream, containing multiple, independent VOD sessions and serving multiple subscribers, is encrypted at the point of distribution to the plant and in turn to the subscribers. The control of the encryption and entitlements is based upon interaction between the session manager 26, which controls the session, video server 22 and the conditional access system through defined interfaces. Many session based VOD architectures share the following common drawbacks:

Coordination and/or distribution of entitlements and synchronization between session manager, conditional access system and stream encryption device.

Security of the clear content from theft or piracy before loading on the video server and while stored in the system.

Additional costs for adding both legacy and alternate stream encryption devices.

Availability of legacy stream encryption devices with reasonable densities (session capacity).

According to MSOs familiar with the subject, session based VOD streams are unsupported by certain existing conditional access technologies.

With session-based encryption (compared to the pre-encryption scheme) additional security is afforded by the application of unique encryption keys used for every session of the same program.

In most cases, the video server does not need to generate special PSI that is aware of the conditional access method used for a specific session. The encryption device(s) downstream of the video server will append CA information specific to each session processed at the time/point of encryption. The VOD session manager 26 manages which streams are processed by which CA method and in some cases, manages dynamically routing the streams to/through the encryption devices appropriate for a particular session.

As with other architectures, there are variations on the basic architecture of the session-based system and some of those variations are described below.

Composite Session Based Encryption

Figure 2:
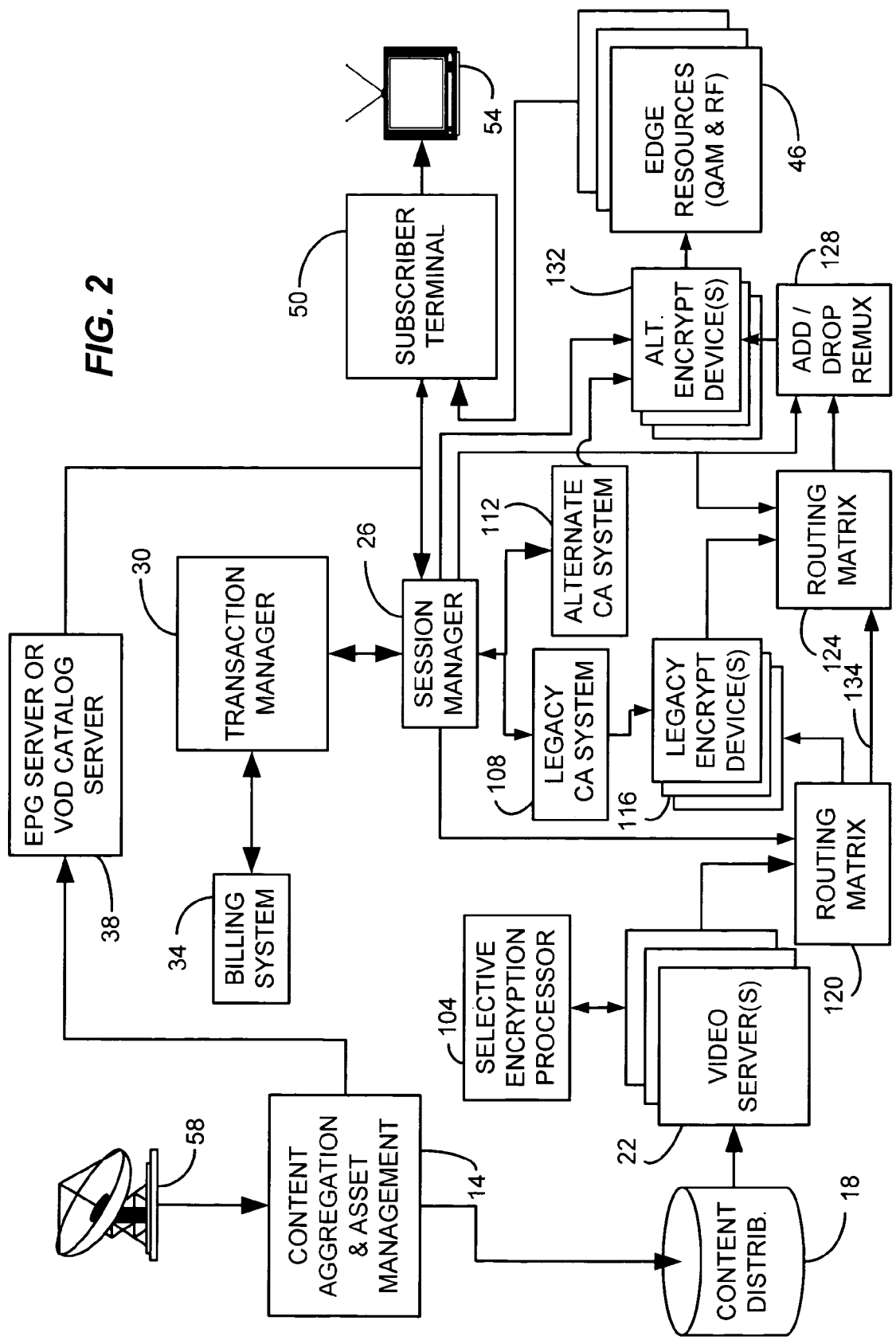
FIG. 2 is a block diagram of a composite session based encrypted VOD architecture consistent with certain embodiments of the present invention.

The composite session based encryption approach is a type of session-based approach that allows multiple conditional access systems to operate in a single VOD system. In this arrangement, as depicted in FIG. 2, the appropriately encrypted stream is provided to a subscriber by routing the outgoing stream from the VOD server 22 to the subscriber terminal 50 on a transport stream and resultant RF carrier, carrying multiple conditional access formats and multiple sessions in a single heterogeneously, encrypted multiplex. There is no sharing of resources between'the CA systems and they operate independently. A single transport may contain any combination of two or more CA formats operating independently on a program basis representing individual subscriber sessions.

In this embodiment, during loading of the new content on the VOD server 22, the content is processed by the VOD server 22 through internal software, or by an external device such as selective encryption processor 104. This process identifies and segregates "critical" packets (see definition above) using any suitable selective encryption selection process. That is, it identifies packets that are to be encrypted later. The "critical" packets are segregated by associating them with one or more new, previously unused PIDs. The composite stream made up of the original bulk, "non-critical" content and segregated "critical" content can be either stored as a single asset (e.g., a single file) on the VOD server 22 or the content may be stored in two separate files ("critical" and "non-critical") with each transmitted separately. Also alternatively, new PIDs could be assigned to each of the "critical" and "non-critical" content. In either case, the content can be stored unencrypted (in the clear).

If one refers to the example movie scenario described above, the same movie using 3.618 GB of storage in the clear VOD state would require 3.618 GBytes to store using composite session based encryption supporting two (or more) different CA systems.

When a subscriber terminal 50 requests VOD content from the headend, the session manager 26 provisions either the legacy CA system 108 or the alternate CA system 112 (depending upon whether the subscriber terminal 50 is capable of legacy or alternate decryption). If the subscriber terminal 50 is legacy decryption compatible, the legacy CA system 108 in turn provisions the legacy encryption device (s) to carry out the encryption process. In this example, the legacy encryption device 116 is configured to encrypt packets identified by the new PIDs associated with "critical" content and the content is routed from VOD server 22 by routing matrix 120 the legacy encryption device 116. The "non-critical" content bypasses the legacy encryption device altogether and is routed by routing matrix 120 directly to routing matrix 124 by path 134.

After encryption at 116, the selectively encrypted content along with the non-"critical" content received via route 134 is routed by routing matrix 124 through add/drop re-multiplexer 128, alternate encryption device 132 and edge resources 46 to the subscriber terminal 50. In this embodiment, the alternate encryption device 132 simply passes the content without acting on it since the alternate encryption device 132 has not been configured to carry out encryption of the content passing therethrough. In this example, the add/drop re-multiplexer 128 reconstitutes the content from legacy encryption device 116 and from path 134 into a single stream by interleaving the incoming packets ("critical" and "non-critical") into a single correctly ordered stream. Add/drop re-multiplexer serves to re-clock the stream by inserting new timing information and may also remap the PIDs if required (and may also modify the PSI information if necessary) to assure that the stream is a proper MPEG transport stream that carries a unique set of PIDs appropriate to the destination subscriber terminal for the current session.

Note that the PIDs may be remapped for storage on the VOD server, but this remapping only segregates the "critical" and "non-critical" content. Prior to transmission to the subscriber, the PIDs can be remapped to assure that each instance of the content playback associated with each VOD session carries a unique set of PIDs that are used by the individual subscriber terminal associated with the particular VOD session. Thus, the same content may be sent to many subscribers using different sets of PIDs in order to distinguish the different sessions.

In accordance with the above example, the legacy encryption device 116 is lightly loaded since it may only have to process roughly 2-10% of the content ultimately destined to the subscriber terminal 50. Accordingly, the headend and network can utilize fewer legacy encryption devices 116 resulting in reduced capital expenditures and reduced hardware requirements.

In this example, if the selectively encrypted content is destined for a subscriber terminal 50 that is enabled for alternate encryption, the session manager 26 provisions the alternate CA system 112 to carry out the encryption processing of the stream. Alternate CA system 112 thus provisions the alternate encryption device to encrypt packets bearing the PIDs of the "critical" packets. In this case, the "critical" packets as well as the "non-critical" packets are routed through routing matrix 120 along path 134 to routing matrix 124 to add/drop re-multiplexer 128 to the alternate encryption device 132. The retimed stream from the add/drop re-multiplexer 128 is then selectively encrypted (or fully encrypted) at the alternate encryption device 132 before being routed via edge resources 46 to the subscriber terminal 50.

It is noted that the edge resources 46 is shown to incorporate QAM and RF functions. However, in many configurations, the edge resources may also incorporate any or all of the alternate encryption device 132, the add/drop re-multiplexer 128 and possibly even the routing matrix 124.

Thus, in accordance with certain embodiments consistent with the present invention, a Video On Demand (VOD) server arrangement has a device for receiving content from a selective encryption processor that processes content to be delivered in a VOD method by selecting first portions of the content for encryption under a selective encryption system and selecting second portions of the content to remain unencrypted. At least one computer readable storage device is incorporated and a processor that: stores the first and second portions in the at least one computer readable storage device; receives a request for delivery of the content, the request being from a terminal having decryption capabilities associated with either a first decryption method or a second decryption method; and determines if the request is from a terminal having decryption capabilities associated with a first decryption method or a second decryption method. If the request is from a terminal having decryption capabilities associated with the first decryption method, then a routing arrangement routes the first portions to a first encryption device and routes the second portions around the first encryption device. A first encryption device encrypts the first portions using a first encryption process to produce encrypted first portions; and the stream of selectively encrypted content is assembled from the encrypted first portions and the second portions.

In a further embodiment, if the request is from a terminal having decryption capabilities associated with the second decryption method: the stream of content is assembled from the first portion and the second portion; the routing mechanism routes the stream to a second encryption device; and a second encryption device encrypts the first portion using a second encryption process to produce a selectively encrypted stream.

In accordance with the above example, the process 200 depicted in FIG. 3 can be utilized starting at 204. In this embodiment, the content is stored on the VOD server 22 with "critical" packets identified, e.g., using a new PID. When a request is received for content from a subscriber terminal 50 at 212, a determination is made as to the decryption capability of the subscriber terminal 50 (e.g., STB) at 216. If the subscriber terminal is enabled for a first encryption system (e.g., a legacy encryption system) at 216, control passes to 222 where "critical" packets are routed to a CA1 enabled encryption device (116) for encryption of the selected packets. "Non-critical" packets are routed around the CA1 enabled encryption device 116 at 226. At 230, the stream is reconstituted and retimed by appropriately interleaving and retiming the encrypted "critical" packets with the "non-critical" packets. The reconstituted selectively encrypted content is then routed to the subscriber terminal 50 at 236 and the process returns at 240.

In the event it is determined that the subscriber terminal is enabled for a second encryption system (CA2) at 216, control passes to 244 where both the "critical" and the "non-critical" packets are routed around the CA1 encryption device. The packets are retimed and interleaved to reconstitute the stream at 248. The reconstituted stream is then passed through the CA2 encryption device at 252 for selective encryption of the "critical" content to produce a selectively encrypted stream. Control then passes to 236 as before.

Thus, according to certain embodiments, a VOD method involves processing content by selecting first portions of the content for encryption under a selective encryption system and selecting second portions of the content to remain unencrypted. The first portions and the second portions are stored. Upon receipt of a request for delivery of the content, the process involves determining if the request is from a terminal having decryption capabilities associated with a first decryption method or a second decryption method. If the request is from a terminal having decryption capabilities associated with the first decryption method, then the process involves routing the first portions to a first encryption device; routing the second portions around the first encryption device; encrypting the first portions using a first encryption process at the first encryption device to produce encrypted first portions; and assembling a stream of selectively encrypted content from the encrypted first portions and the second portions.

In a further embodiment, if the request is from a terminal having decryption capabilities associated with the second decryption method, then the process involves assembling a stream of content from the first portion and the second portion; routing the stream to a second encryption device; and encrypting the first portions using a second encryption process at the second encryption device to produce a selectively encrypted stream.

If the selective encryption processing of the stream during loading of the content onto the VOD server 22 is eliminated, the storage requirement and complexity of the session playback are reduced since the routing decisions around the legacy encryption device(s) can optionally be eliminated. This arrangement also eliminates the need for the add/drop multiplexer and the remapping of PIDs to reconstitute a full transport stream. However, the negative aspect of this version of the topology is additional legacy encryption equipment since the full transport multiplex for each legacy session is passed through the legacy encryption device. Thus many more (perhaps ten to fifty times more) legacy encryption devices are used to provide the same level of service than the system described above.

In certain embodiments, the advantage offered is the savings in hardware and capital equipment required to add a conditional access system to an existing VOD system, which presently has no multiple encryption capability, as is the case at present in most U.S. cable systems. Additionally, it does not create a capital cost penalty to introduce two concurrent yet independent CA systems to a VOD system since some 70% of the systems currently deployed have QAM edge devices containing latent capability to perform CA encryption (such devices are commercially available from Harmonic NSG).

In the composite session-based encryption of VOD content, a new session is initiated in which the VOD session manager determines which conditional access format is compatible with the requesting subscriber terminal equipment (e.g., set top box) based upon information received directly from the subscriber equipment or from another resource such as the billing system 34. The VOD session manager 26 then determines the path to the appropriate encryption resource(s) having access to an RF node serving the subscriber's service area. The process that follows then depends upon what type of encryption equipment is employed to provide the VOD content to the subscriber.

If the session is destined for a legacy encryption enabled subscriber terminal, the session manager initiates encryption of the session via the legacy CA system 108, which in turn provisions the legacy encryption device 116. The legacy CA system is commanded only to process packets bearing the PIDs representing "critical" content to be encrypted. The remaining content (the bulk of the content) is identified by a different PID and is left unencrypted, and in fact bypasses the legacy encryption device 116. The edge devices which may contain add/drop multiplex, second CA encryption and QAM modulator elements, is configured by the session manager 26 to remap the segregated "critical" content and "non-critical" data back to a single, common PID. If the "critical" content is stored in a separate file on the VOD server 22, then the two files representing the entire content is streamed. In this case, routing matrix 120 is also tasked to send the "non-critical" content around the legacy encryption device via path 134, thus freeing bandwidth from the encrypter so that roughly a 10 to 50 fold improvement in session capacity can be realized on a single encryption device. The bypass stream is recovered as part of the functions of routing matrix 124. The "non-critical" and encrypted "critical" content streams are still recombined into a single stream at the add/drop re-multiplexer 128, which may be incorporated into the edge device.

If the session is destined for a non-legacy encryption enabled subscriber terminal, the session manager 26 initiates the encryption of the session via the alternative conditional access system 112, which in turn provisions the alternate CA encryption device 132. The alternative CA system is commanded to process all the PIDs on the original transport PID, which initially carries only the "non-critical" content. The session manager 26 configures the routing matrix 120 and 124 to send the content along path 134 to bypass the legacy encryption device, which has no function in delivery of content to a non-legacy encryption enabled subscriber terminal. The add/drop re-multiplexer 128, the second CA encrypter 132 and the QAM modulator and RF elements 46 are configured by the session manager 26 to re-map the segregated "critical" data and the "non-critical" data back to a single, common PID which is then subsequently encrypted as described above at alternate encryption device 132. If the "critical" content is stored in a separate file on the VOD server 22, then the two files representing the entire content selection is streamed to the subscriber terminal. In this case, the "non-critical" and "critical" content streams are still recombined into a single stream (e.g., at add/drop re-multiplexer or other location in the edge devices) prior to alternative encryption.

In a variation of the above embodiments, the "critical" and "non-critical" content can be stored as a single file at VOD server 22. In this example, the full content ("critical" and "non-critical") is routed through either the legacy encryption device 116 or the alternate encryption device 132. Alternatively, the content from the single file can be routed based upon PID by routing matrix 120 either to legacy encryption device 116 or routing matrix 124, essentially splitting the single file for selective encryption before reconstitution of the stream. In this process, blocks 208 and 212 of process 200 are modified to reflect that the content is stored in a single file and that the file is split into "critical" and "non-critical" content upon receipt of a request for the content. Other variations will occur to those skilled in the art upon consideration of the present teachings.

Thus, in certain embodiments consistent with the present invention, a Video On Demand (VOD) method involves receiving a request for delivery of content; retrieving the content from a storage medium; processing the retrieved content by selecting first portions of the content for encryption under a selective encryption system and selecting second portions of the content to remain unencrypted; and determining if the request is from a terminal having decryption capabilities associated with a first decryption method or a second decryption method. If the request is from a terminal having decryption capabilities associated with the first decryption method, then the process involves routing the first portions to a first encryption device; routing the second portions around the first encryption device; encrypting the first portions using a first encryption process at the first encryption device to produce encrypted first portions; and assembling a stream of selectively encrypted content from the encrypted first portions and the second portions.

In a further embodiment, if the request is from a terminal having decryption capabilities associated with the second decryption method, then the embodiment involves assembling a stream of content from the first portion and the second portion; routing the stream to a second encryption device; and encrypting the first portions using a second encryption process at the second encryption device to produce a selectively encrypted stream.

Those skilled in the art will recognize, upon consideration of the above teachings, that certain of the above exemplary embodiments are based upon use of a programmed processor serving, for example, as video server or servers 22 or session manager 26. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

Certain embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain embodiments herein were described in conjunction with specific circuitry that carries out the functions described, other embodiments are contemplated in which the circuit functions are carried out using equivalent software or firmware embodiments executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

Software and/or firmware embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A Video On Demand (VOD) method that provides session based selective encryption, comprising:
    processing content by selecting first portions of the content for encryption under a selective encryption system and selecting second portions of the content to remain unencrypted;
    storing the first portions;
    storing second portions;
    receiving a request for delivery of the content from a subscriber terminal to initiate a VOD session;
    determining if the subscriber terminal has decryption capabilities associated with a first decryption method or a second decryption method;
    if the request is from a subscriber terminal having decryption capabilities associated with the first decryption method, then for each such request from a subscriber terminal having decryption capabilities associated with the first decryption method to initiate a VOD session:
        routing the first portions to a first encryption device that encrypts content for decryption under the first encryption method, to provide encryption of the first portions for the VOD session;

routing the second portions around the first encryption device;

encrypting neither the first nor the second portions using a second encryption device that encrypts content for decryption under the second decryption method for the VOD session;

encrypting the first portions using a first encryption process at the first encryption device to produce encrypted first portions; and if the request is not from a subscribing terminal having decryption capabilities associated with the first decryption method:

routing the first portions to a second encryption device that encrypts content for decryption under the second encryption method, to provide encryption of the first portions for the VOD session:

routing the second portions around the second encryption device;

encrypting neither the first nor the second portions using the first encryption device that encrypts content for decryption under the first decryption method for the VOD session;

encrypting the first portions using the second encryption process at the second encryption device to produce encrypted first portions; and assembling a stream of selectively encrypted content from the encrypted first portions and the second portions to produce a selectively encrypted stream of content that is individually encrypted for delivery during the VOD session.

2. The VOD method according to claim 1, wherein the first portions are stored in a first file and the second portions are stored in a second file.

3. The VOD method according to claim 2, wherein the first and second files are stored in a VOD server.

4. The VOD method according to claim 1, further comprising streaming the selectively encrypted content to the terminal.

5. The VOD method according to claim 1, wherein the first decryption method comprises a non-legacy encryption method.

6. The VOD method according to claim 1, wherein the assembled stream is passed through a second encryption device that is not provisioned to carry out encryption processing on the stream.

7. The VOD method according to claim 1, wherein the second decryption method comprises a non-legacy encryption method.

8. The VOD method according to claim 1, carried out under control of a programmed processor.

9. Computer readable storage medium storing instructions which, when executed on a programmed processor, carry out a process according to claim 1.

10. A Video On Demand (VOD) method that provides session based selective encryption, comprising:

processing content by selecting first portions of the content for encryption under a selective encryption system and selecting second portions of the content to remain unencrypted;

storing the first portions;

storing second portions;

receiving a request for delivery of the content from a subscriber terminal to initiate a VOD session;

determining if the subscriber terminal has decryption capabilities associated with a first decryption method or a second decryption method;

if the request is from a subscriber terminal having decryption capabilities associated with the first decryption method, then for each such request from a subscriber terminal having decryption capabilities associated with the first decryption method to initiate a VOD session:

routing the first portions to a first encryption device that encrypts content for decryption under the first encryption method, to provide encryption of the first portions for the VOD session;

routing the second portions round the first encryption device;

encrypting the first portions using a first encryption process at the first encryption device to produce encrypted first portions; and assembling a stream of selectively encrypted content from the encrypted first portions and the second portions to produce a selectively encrypted stream of content that is individually encrypted for delivery during the VOD session;

if the request is not from a subscriber terminal having decryption capabilities associated with the first decryption method, but instead the request is from a terminal having decryption capabilities associated with the second decryption method, then for each such request from a subscriber terminal having decryption capabilities associated with the second decryption method to initiate a VOD session:

assembling a stream of content from the first portion and the second portion;

routing the stream to the second encryption device; and encrypting the first portions using the second encryption device to produce an encrypted stream of content that is individually encrypted for delivery during the VOD session.

11. The VOD method according to claim 10, wherein the first and second portions are stored in a VOD server.

12. The VOD method according to claim 10, further comprising sending the selectively encrypted content to the terminal.

13. The VOD method according to claim 10, wherein the second decryption method comprises a legacy encryption method.

14. The VOD method according to claim 10, wherein the first decryption method comprises a non-legacy encryption method.

15. The VOD method according to claim 10, carried out under control of a programmed processor.

16. Computer readable storage medium storing instructions which, when executed on a programmed processor, carry out a process according to claim 10.

17. A Video On Demand (VOD) server arrangement that provides session based encryption, comprising:

means for receiving content from a selective encryption processor that processes content to be delivered in a VOD method by selecting first portions of the content for encryption under a selective encryption system and selecting second portions of the content to remain unencrypted;

a router;

a first encryption device;

a second encryption device;

at least one computer readable storage device;

a processor that:

stores the first and second portions in the at least one computer readable storage device;

receives a request for delivery of the VOD content as a VOD session, the request being from a subscriber terminal having decryption capabilities associated with either a first decryption method or a second decryption method;

determines if the request is from a terminal having decryption capabilities associated with the first decryption method or the second decryption method;

if the request is from a terminal having decryption capabilities associated with the first decryption method, then for each such request from a subscriber terminal having decryption capabilities associated with the first decryption method to initiate a VOD session:

the processor instructs the router to route the first portions to the first encryption device and not the second encryption device, and routes the second portions around the first encryption device and around the second encryption device;

wherein, the first encryption device encrypts the first portions using a first encryption process to produce encrypted first portions;

if the request is not from a terminal having decryption capabilities associated with the first decryption method:

the router routes the first portions to the second encryption device that encrypts content for decryption under the second encryption method, to provide encryption of the first portions for the VOD session;

the router further routs the second portions around the second encryption device;

neither the first nor the second portions are encrypted using the first encryption device that encrypts content for decryption under the first decryption method for the VOD session;

the first portions are encrypted using the second encryption process at the second encryption device to produce encrypted first portions; and means for assembling a stream of selectively encrypted content from the encrypted first portions and the second portions.

18. The server arrangement according to claim 17, wherein:

if the request is not from a subscriber terminal having decryption capabilities associated with the first decryption method, but instead the request is from a terminal having decryption capabilities associated with the second decryption method, then for each such request from a subscriber terminal having decryption capabilities associated with the second decryption method to initiate a VOD session:

the processor instructs the first router to route the stream to a second encryption device; and:

wherein the second encryption device encrypts the first portions using a second encryption process to produce a selectively encrypted stream.

19. The VOD server according to claim 17, wherein the first portions are stored in a first file and the second portions are stored in a second file.

20. The VOD server according to claim 17, further comprising means for streaming the selectively encrypted content to the terminal.

21. The VOD server according to claim 17, wherein the first encryption device encrypts using a legacy encryption method.

22. The VOD server according to claim 19, wherein the second encryption device encrypts using a non-legacy encryption method.

23. A Video On Demand (VOD) method that provides session based encryption, comprising:

receiving a request for delivery of content from a subscriber terminal;

retrieving the content from a storage medium;

processing the retrieved content by selecting first portions of the content for encryption under a selective encryption system and selecting second portions of the content to remain unencrypted;

determining if the request is from a subscriber terminal having decryption capabilities associated with a first decryption method or a second decryption method;

for each request from a subscriber terminal having decryption capabilities associated with the first decryption method to initiate a VOD session:

routing the first portions to a first encryption device;

routing the second portions around the first encryption device;

encrypting the first portions using a first encryption process at the first encryption device to produce encrypted first portions; and assembling a stream of selectively encrypted content from the encrypted first portions and the second portions to produce a selectively encrypted stream of content that is individually encrypted for delivery during the VOD session.

24. The VOD method according to claim 23, wherein the first portions and the second portions are stored in a computer readable file.

25. The VOD method according to claim 24, wherein the computer readable file is stored in a VOD server.

26. The VOD method according to claim 24, further comprising streaming the selectively encrypted content to the terminal.

27. The VOD method according to claim 24, wherein the first decryption method comprises a legacy encryption method.

28. The VOD method according to claim 24, wherein the assembled stream is passed through a second encryption device that is not provisioned to carry out encryption processing on the stream.

29. The VOD method according to claim 24, further comprising:

for each request from a subscriber terminal having decryption capabilities associated with the second decryption method to initiate a VOD session:

assembling a stream of content from the first portion and the second portion;

routing the stream to a second encryption device; and encrypting the first portions using a second encryption process at the second encryption device to produce a selectively encrypted stream of content that is individually encrypted for delivery during the VOD session.

30. The VOD method according to claim 24, wherein the second decryption method comprises a non-legacy encryption method.

31. The VOD method according to claim 24, carried out under control of a programmed processor.

32. A computer readable storage medium storing instructions which, when executed on a programmed processor, carry out a process according to claim 24.

* * * * *

UNITED STATES PATENT AND TRADEMARK OFFICE
CERTIFICATE OF CORRECTION

PATENT NO. : 7,343,013 B2  Page 1 of 1
APPLICATION NO. : 10/823431
DATED : March 11, 2008
INVENTOR(S) : Leo M. Pedlow, Jr.

It is certified that error appears in the above-identified patent and that said Letters Patent is hereby corrected as shown below:

In Claim 22, column 15, line 63, delete "19" and insert -- 18 -- therefor.

Signed and Sealed this

Twentieth Day of May, 2008

JON W. DUDAS
*Director of the United States Patent and Trademark Office*